(12) United States Patent
Fixemer

(10) Patent No.: US 7,303,157 B1
(45) Date of Patent: Dec. 4, 2007

(54) METHOD AND MEANS FOR PREVENTING A SELF-PROPELLED IRRIGATION SYSTEM FROM OVERTURNING

(76) Inventor: Richard A. Fixemer, 607 E. Hickory, Sutton, NE (US) 68979

(*) Notice: Subject to any disclaimer, the term of this patent is extended or adjusted under 35 U.S.C. 154(b) by 427 days.

(21) Appl. No.: 10/886,869

(22) Filed: Jul. 8, 2004

(51) Int. Cl.
*B05B 3/18* (2006.01)

(52) U.S. Cl. .......................... 239/726; 239/723
(58) Field of Classification Search ......... 239/723–749
See application file for complete search history.

(56) References Cited

U.S. PATENT DOCUMENTS 4,330,085 A * 5/1982 Siekmeier et al. ............ 239/1

6,651,903 B1 * 11/2003 Nuss ........................ 239/127

* cited by examiner

*Primary Examiner*—Christopher Kim
(74) *Attorney, Agent, or Firm*—Dennis L. Thomte; Thomte Law Office

(57) ABSTRACT

A selectively fillable ballast water tank is secured to the main frame of the drive units of a self-propelled irrigation machine. The water tank is selectively filled with water from the water pipeline when the system is going to remain stationary for a period of time, thereby reducing the risk that the drive unit will overturn when experiencing a high wind situation. The ballast water tanks are drained when the system is going to be used to irrigate.

13 Claims, 3 Drawing Sheets

METHOD AND MEANS FOR PREVENTING A SELF-PROPELLED IRRIGATION SYSTEM FROM OVERTURNING

FIELD OF THE INVENTION

This invention relates to a self-propelled irrigation machine or system and more particularly to a method and means for preventing the system from overturning in a high wind situation. Even more particularly, this invention prevents the system from overturning in a high wind situation by mounting a water tank on at least some, if not all, the drive units. The water tanks are filled with water for ballast when the system is not in operation. The water tanks are drained when the system is going to irrigate.

DESCRIPTION OF THE RELATED ART

Some irrigation systems or machines such as center pivot systems, lateral move systems and corner irrigation systems have a tendency to overturn or "tip over" when subjected to high winds. The overturning of the systems is at least partially due to the fact that the systems are top-heavy since the water pipeline or boom is positioned several feet above the main frame of the drive units.

SUMMARY OF THE INVENTION

A method and means for preventing a self-propelled irrigation system from overturning when subjected to a high wind condition is disclosed. Self-propelled irrigation systems such as lateral move irrigation systems and center pivot irrigation systems include an elongated water pipeline which is supported along its length by a plurality of spaced-apart drive units or towers. A ballast water tank is preferably mounted on all the drive units of the irrigation systems. A water conduit extends from the water pipeline to the ballast water tank and an electrically operated and remotely controlled switch is imposed in the conduit to enable water from the pipeline to be introduced into the ballast water tank when the irrigation system is not being used to irrigate. The tank is also provided with a discharge opening or drain opening which is also selectively opened and closed by means of an electric switch which is also remotely controlled. When the irrigation system is to remain stationary for a period of time during non-irrigating periods, the ballast water tanks are filled with water and the weight thereof acts as a ballast to prevent the system from overturning when subjected to high winds. When the system is going to be used to irrigate, the ballast water tanks are drained to reduce the weight thereof and to reduce stress on the drive unit.

It is therefore a principal object of the invention to provide a method and means for preventing a self-propelled irrigation system from overturning in a high wind situation.

Another object of the invention is to provide a means for preventing a self-propelled irrigation system from overturning in a high wind situation by mounting a ballast water tank on at least some of the drive units of the irrigation system, and preferably all of the drive units, with the ballast water tanks being selectively filled with water from the pipeline.

Still another object of the invention is to provide a means for preventing a self-propelled irrigation system from overturning which may be installed on the self-propelled irrigation system without extensive modification thereof.

These and other objects will be apparent to those skilled in the art.

DETAILED DESCRIPTION OF THE INVENTION

Figure 1:
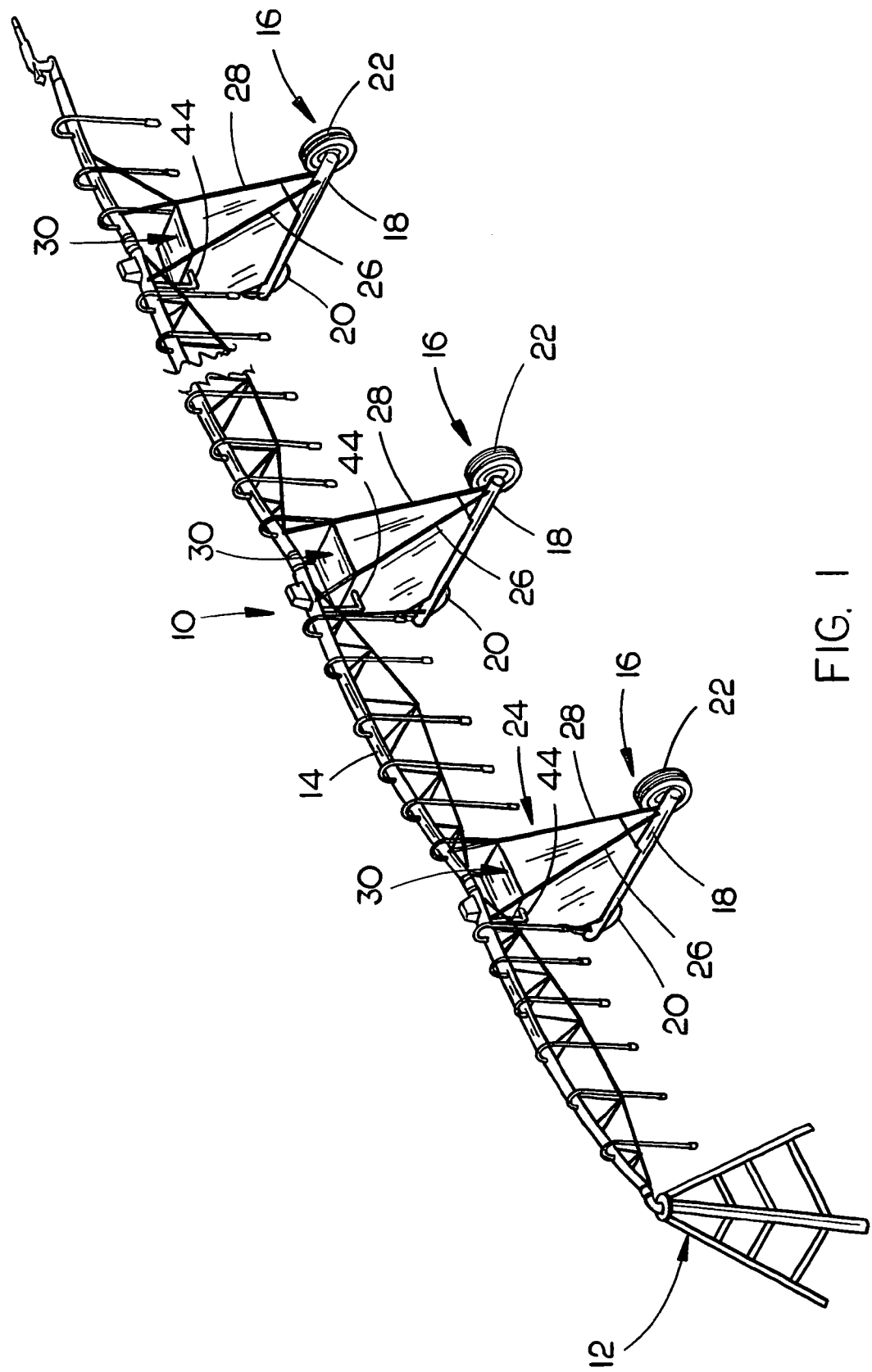
FIG. 1 is a partial perspective view of a self-propelled irrigation system having the invention mounted on the drive units thereof.

The numeral 10 refers to a conventional center pivot irrigation system which is conventional in design except for the means of this invention which is designed to prevent the overturning of the system during periods of high wind. Center pivot irrigation machine 10 is commonly referred to as a self-propelled irrigation system. Another type of self-propelled irrigation system is what is termed a lateral move irrigation system. The invention disclosed herein will work equally as well on center pivots as on lateral move systems. Further, the means of this invention will also work on irrigation systems which are described as corner pivot irrigation machines which are center pivot irrigation machines having a swing arm assembly mounted at the outer end thereof.

If a corner pivot irrigation system or a center pivot irrigation system is being utilized, the system 10 will include a center pivot structure 12 having a water conduit or pipeline 14 supported upon a plurality of drive units or towers 16. Lateral move irrigation systems do not utilize a center pivot structure but simply travel across a field rather than rotating around a center pivot structure as does a center pivot irrigation system. Each of the drive units 16 includes a main frame 18 having drive wheels 20 and 22 mounted at the opposite ends thereof. A support frame 24 interconnects the main frame 18 with the pipeline 14. Normally, the support frame 24 includes a pair of support members 26 and 28 which are secured to one end of the main frame 18 and which extend upwardly and inwardly therefrom in a diverging fashion with the upper ends thereof being connected to the pipeline 14. Similarly, support frame 24 includes a pair of support members identical to support members 26 and 28 which are secured at their lower ends to the other end of main frame 18 and which extend upwardly and inwardly therefrom in a diverging relationship towards the pipeline 14 with the upper ends thereof being secured to the pipeline 14.

Figure 2:
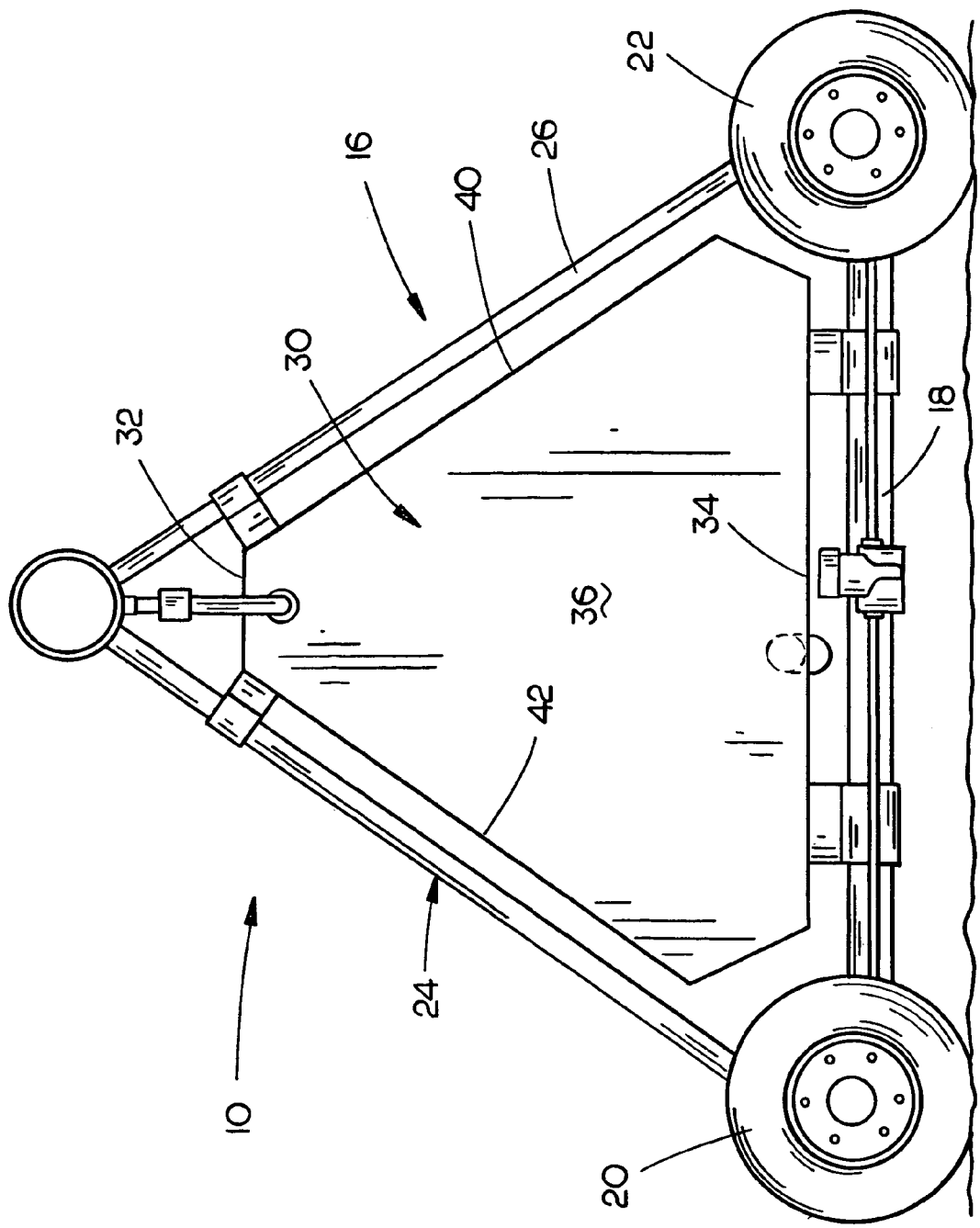
FIG. 2 is an end view of the invention mounted on a drive unit.
Figure 3:
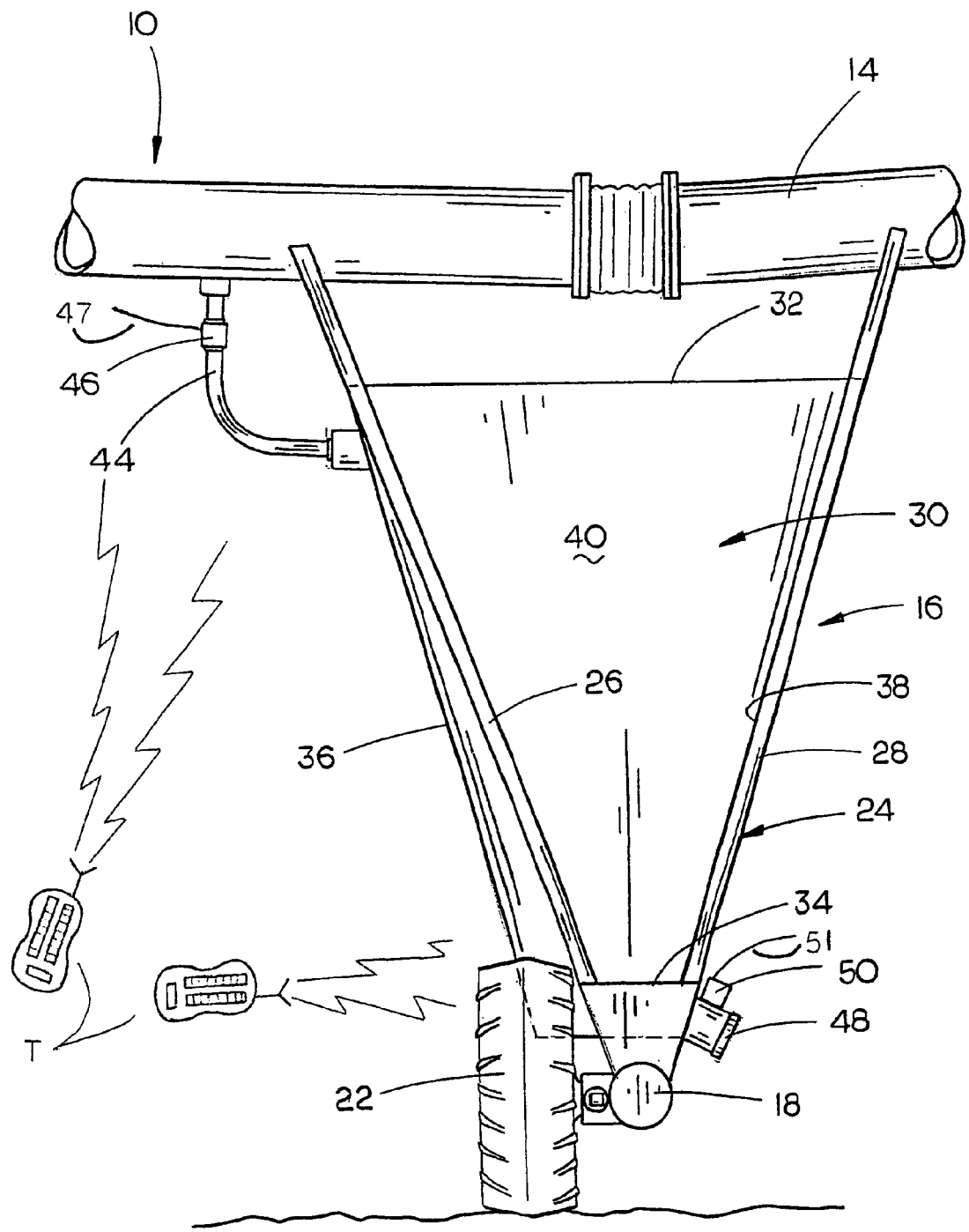
FIG. 3 is a side view of the invention mounted on a drive unit.

The numeral 30 refers to a ballast water tank which is mounted on at least some of the drive units 16, and preferably on all of the drive units 16 so as to prevent the overturning of the system when the system is subjected to high winds. For purposes of description, tank 30 will be described as having an upper end 32, lower end 34, inner side wall 36, outer side wall 38, and opposite end walls 40 and 42. The lower end of the tank 30 is operatively secured to and supported upon the main frame 18 and is also preferably secured to the support frame 24 by any convenient means. When the ballast water tank 30 is viewed from either its inner or outer side, the water tank 30 defines a generally triangular shape (FIG. 2). When the ballast water tank is viewed from either of its end walls, the tank generally defines an inverted triangle shape (FIG. 3). As seen in FIG. 3, the width of the tank 30 is greater at its upper end than at its lower end so that when the tank is filled with water for ballast, the increased width at the top of the tank will allow for freezing of the water without rupturing the tank.

Water conduit 44 is connected to the pipeline 14 and extends downwardly to the tank 30 so that water from the pipeline 14 may be introduced into the interior of the tank as desired. For that purpose, an electrically operated and remotely controlled valve 46 is imposed in the conduit 44. Tank 30 is provided with a discharge opening or drain opening 48 which is selectively closed and opened by means of an electrically operated valve 50 which is also remotely controllable. The valves 46 and 50 could be hydraulically controllable if so desired.

Normally, when the irrigation system is being used to irrigate, the ballast tanks 30 will be empty. If the system is going to be shut down for a period of time, the valves 46 are remotely opened and the valves 50 are remotely closed. Water from within the pipeline 14 fills the tanks 30 and the weight of the tanks and the water therein acts as a ballast for the drive units so that the system will not overturn in a high wind situation. The increased width of the tank at its upper end, as described above, prevents the tank from rupturing should the water in the tank freeze. When the tanks 30 are filled, valves 46 are closed.

When the system is going to be used to again irrigate, the valves 50 are remotely opened so that the water in the tanks 30 will be discharged therefrom to reduce the weight on the drive unit. During the draining of the tanks 30, the valves 46 are obviously closed to prevent further water from entering the tanks from the water pipeline.

Although it is preferred that the tanks 30 be filled from the pipeline 14, a separate water line could be extended along the length of the system for filling the tanks.

Thus it can be seen that a novel method and means has been provided for preventing an irrigation system such as a center pivot irrigation system, a lateral move irrigation system or a corner pivot irrigation system from overturning in high wind situations.

Thus it can be seen that the invention accomplishes at least all of its stated objectives.

I claim:

1. A self-propelled irrigation system, comprising:
   an elongated water pipeline supported upon the upper ends of drive units which are spaced along the length of the pipeline;
   said water pipeline being in communication with a source of water under pressure;
   said drive units each including a wheeled frame including a support frame extending upwardly therefrom which is attached to said water pipeline;
   at least some of said drive units having a ballast water tank operatively secured to the wheeled frame and/or support frame thereof;
   said ballast water tank having a water inlet opening and a water discharge opening;
   a water conduit extending from said water inlet opening to said water pipeline to provide fluid communication between said water pipeline and said ballast water tank;
   a first water valve imposed in said water conduit;
   said water discharge opening having a second water valve associated therewith.

2. The system of claim 1 wherein a majority of said drive units have a ballast water tank mounted thereon.

3. The system of claim 1 wherein all of said drive units have a ballast water tank mounted thereon.

4. The system of claim 1 wherein said wheeled frame includes a main frame which extends between a pair of spaced-apart drive wheels and wherein said ballast water tank is secured to said main frame between said drive wheels.

5. The system of claim 1 wherein said ballast water tank has upper and lower ends, inner and outer sides, and opposite ends.

6. The system of claim 5 wherein said ballast water tank is generally triangular in shape when viewed from its inner or outer sides.

7. The system of claim 6 wherein said ballast water tank defines a generally inverted triangle shape when viewed from either of its opposite ends.

8. The system of claim 7 wherein said upper end of said ballast water tank has a greater width at its upper end to allow for freezing of the water therein without rupturing the ballast water tank.

9. The system of claim 1 wherein the self-propelled irrigation system is a center pivot irrigation system.

10. In combination with a self-propelled irrigation system comprising an elongated water pipeline supported upon the upper ends of drive units which are spaced along the length of the pipeline; said water pipeline being in communication with a source of water under pressure; said drive units each including a wheeled frame including a support frame extending upwardly therefrom which is attached to said water pipeline:
   a ballast water tank operatively secured to the wheeled frame and/or support frame of at least one of the drive units;
   said ballast water tank having a water inlet opening and a water discharge opening;
   a water conduit extending from said water inlet opening to said water pipeline to provide fluid communication between said water pipeline and said ballast water tank;
   a first water valve imposed in said water conduit;
   said water discharge opening having a second water valve associated therewith.

11. The system of claim 10 wherein a majority of said drive units have a ballast water tank mounted thereon.

12. The system of claim 10 wherein all of said drive units have a ballast water tank mounted thereon.

13. The system of claim 10 wherein said wheeled frame includes a main frame which extends between a pair of spaced-apart drive wheels and wherein said ballast water tank is secured to said main frame between said drive wheels.

* * * * *